United States Patent [19]
Andersson

[11] Patent Number: 4,590,126
[45] Date of Patent: May 20, 1986

[54] PACKING LAMINATE

[75] Inventor: Thorbjörn Andersson, Södra Sandby, Sweden

[73] Assignee: Tetra Pak International AB, Lund, Sweden

[21] Appl. No.: 655,721

[22] Filed: Sep. 28, 1984

[30] Foreign Application Priority Data

Oct. 5, 1983 [SE] Sweden ............................... 8305473

[51] Int. Cl.$^4$ ............................................. B32B 27/00
[52] U.S. Cl. ..................................... 428/349; 428/35; 428/511; 428/458; 428/461
[58] Field of Search ................. 428/35, 349, 511, 458, 428/461

[56] References Cited

U.S. PATENT DOCUMENTS

| | | | |
|---|---|---|---|
| 3,972,467 | 8/1976 | Whillock et al. | 428/458 |
| 4,367,841 | 1/1983 | Mazumdar | 428/349 |
| 4,418,841 | 12/1983 | Eckstein | 428/36 |

Primary Examiner—Edith Buffalow
Attorney, Agent, or Firm—Burns, Doane, Swecker & Mathis

[57] ABSTRACT

A packing laminate for the manufacture of packing containers for edible oil must have an oil-resistant inner layer which is not affected by the oil, even during prolonged storage periods. A packing laminate meeting this condition has an extruded inner layer of two types of plastics mixed with one another, namely LLDPE and LDPE.

6 Claims, 1 Drawing Figure

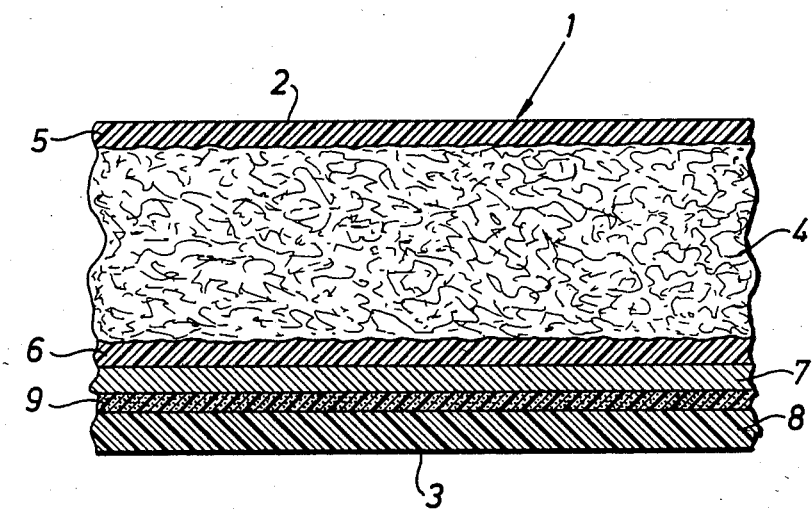

PACKING LAMINATE

BACKGROUND AND SUMMARY OF THE INVENTION

The present invention relates to a packing laminate comprising a carrier layer of a material imparting stiffness and at least one layer of liquid-tight material.

Edible oil or food products which contain edible oil are usually packed in lacquered sheet metal cans, glass bottles or blow moulded plastic bottles. These types of packages are comparatively expensive to manufacture and to handle. Accordingly it is desirable to provide a more rational and less cost-demanding packing container for edible oil products. A suitable type of package could be e.g. the parallelepipedic packing container of laminated material which at present is generally used for the packing of other liquid foodstuffs, e.g. milk and fruit juices. These packing containers are manufactured from a packing laminate, comprising layers of paper, plastics and aluminium foil which by means of folding and sealing is converted to a substantially parallelepipedic container body with corner lugs flattened, folded in and sealed to the container body. Attempts to utilize a packing container of this type for the packaging of edible oil were found to give unsatisfactory results, since the plastic layer of polyethylene which covers the inside of the packing laminate, that is to say the side facing the contents, is not suitable for prolonged contact with edible oil or products containing edible oil. As the described type of package manufactured from the packing laminate has a number of advantages from the point of view of filling as well as handling and cost, it has been tried to overcome the described disadvantages by applying a layer of oil-resistant plastic material to the inside of the laminate. Experiments were carried out with various different types of plastics and in particular the types were tried which are used for the manufacture of the blow moulded plastic bottles mentioned earlier. The type of plastics generally employed for this purpose is a copolymer of ethylene and partially neutralized acrylic acid (EAA) which in the manufacture of blow moulded plastic bottles has proved to be oil-resistant. However, when this type of plastics is applied by extrusion to the inside of a packing laminate, its properties deteriorate so that the material when it has been in contact with oil for a prolonged period results in inferior elongation, and cracks appear when the material is stressed, e.g. by folding. This phenomenon is known as stress-cracking and practical experiments have shown that the coefficient of elongation is reduced to below 10% of the normal coefficient of elongation. The difference between EAA in blown and extruded form is due apparently to the processing temperature which is substantially higher (100°–150° C. higher) on extrusion form. A thermal degradation of the plastic material takes place which contributes to increased brittleness. A further cause is to be found in the different degrees of orientation existing in the blown or extruded film respectively. Blown film is oriented during manufacture in longitudinal as well as in transverse direction which results in manifestly better elongation properties than is the case in an extruded film which is only oriented in its longitudinal direction. Consequently, especially folds in the packing container running transversely in relation to the direction or orientation, will invariably cause crack formation with accompanying leakage and absorption of edible oil in the paper layer of the packing laminate, which impairs the stiffness of the laminate and gives the packing container a less attractive appearance.

It is an object of the present invention to provide a packing laminate which is suitable for the manufacture of packing containers for edible oil or products which contain edible oil, and which is not subject to the disadvantages of the types of packing laminate known previously.

It is a further object of the present invention to provide a packing laminate where the inner layer consists of an extruded plastic layer of a type of plastics which has good oil resistance.

It is a further object of the present invention to provide a packing laminate where stress-cracking does not occur during or after the contact of the laminate with oil.

These and other objects have been achieved in accordance with the invention in that a packing laminate comprising a carrier layer of a material imparting stiffness and at least one layer of liquid-tight material has been given the characteristic that the layer of liquid-tight material is an extruded plastic layer which comprises two types of plastics mixed with one another, namely LLDPE (linear low-density polyethylene) and LDPE (low-density polyethylene.

By mixing LLDPE and LDPE an internal layer packing laminate is achieved, the coefficient of elongation of which is not appreciably affected during extrusion of the layer, which means that stress-cracking does not occur even on prolonged contact with edible oil. To assure a good adhesion between the inner layer consisting of LLDPE and LDPE and adjacent layers of usually aluminium foil, use is made of an intermediate adhesion layer which preferably consists of a partially neutralized EAA (ethylene acrylic acid), that is to ay a copolymer of ethylene and acrylic acid.

BRIEF DESCRIPTION OF THE DRAWINGS

The present invention will now be described in more detail with special reference to the attached schematic drawing which in enlargement shows a cross-section through a part of a preferred embodiment of the packing laminate in accordance with the invention.

DETAILED DESCRIPTION OF THE PREFERRED EMBODIMENT

The packing laminate 1 comprises a number of material layers laminated to each other which together form a packing laminate of the desired strength and impermeability characteristics. The packing laminate 1 has an external surface 2 and an internal surface 3 which after the packing laminate has been converted to packing containers form the outside and inside respectively of the packing container. It is evident from the FIGURE that the greater part of the thickness of the laminate is taken up by a carrier layer 4 which consists of a material imparting stiffness, e.g. paper or foamed plastics. The carrier layer 4 has an appreciably greater thickness than the remaining layers of the laminate, but the exact thickness may vary depending upon the type and size of the packing container into which the packing laminate is to be converted. In the case of the packing container sizes generally used of 0.2–2.0 liters, the paper material chosen for the carrier layer may have a weight per unit area of 120–440 g/m$^2$. A typical value in the manufacture of packing laminate for 1 liter containers is 255 g/m$^2$. The carrier layer may be impregnated wholly or partly with an oil-repelling agent which, however, belongs to prior art and is not, therefore, described in detail in this patent application.

On both sides of the carrier layer 4 comparatively thin layers 5,6 of a liquid-tight, thermoplastics material, e.g. polyethylene, are present. The polyethylene layer 5 on the outside 2 of the packing laminate imparts a smooth and liquid-tight exterior to the packing laminate which, moreover, makes possible a sealing of the laminate with the help of heat and pressure, a so-called thermosealing. This external layer of thermoplastics consists of LDPE (Low Density Polyethylene) which has a weight of coating of 12-30 g/m². When the packing laminate is to be converted to packing containers with a volume of 1 liter, generally a weight of coating of 20 g/m² is used.

The thermoplastic layer 6 applied to the opposite side of the carrier layer 4 also consists of LDPE with a similar weight of coating. Like the layer 5, the layer 6 is applied to the carrier layer 4 by means of extrusion which means that the layers 5,6 are applied to the carrier layer 4 in liquid state and penetrate into the surfce layer of the latter so that the seal between the layers 5 and 6 respectively and the carrier layer 4 is very good. The main task of the layer 6 is to make possible the application of a metal foil layer 7 which in most cases consists of aluminium foil of a thickness of 5-18μ, preferably 7μ (corresponding to a weight of coating of 19 g/m². The layer 7 serves as a barrier layer which prevents light as well as oxygen from reaching the contents, which is advantageous since the contents are thus given better keeping quality. It is not desirable, however, for the contents to come into direct contact with the metal foil layer and this is coated, therefore, in general with a further layer which in the packaging of milk, fruit juice and other beverages usually consists of polyethylene. However, polyethylene is not oil-resistant and the packing laminate in accordance with the invention, therefore, comprises an inner layer of two types of plastics mixed with one other, namely LLDPE (linear low density polyethylene) and LDPE (low density polyethylene). An inner layer of this type, however, has comparatively poor adhesive properties and so as to improve these, and intermediate adhesion layer 9 is made use of which joins the inner layer 8 to the metal foil and preferably consists of partially neutralized EAA (ethylene acrylic acid), that is to say a copolymer of ethylene and acrylic acid. The inner layer 8 of mixed LLPDE and LDPE has a weight of coating of preferably 30 g/m². In the manufacture of packing containers of smaller volume (0.2 liters) the weight of coating may be reduced a little further, but approximately 20 g/m² has proved to be a lower limit so as to avoid crack formation or other types of leaks. The intermediate adhesion layer 9 has a coating weight of preferably 15 g/m², but very low coating weights may be used and even a weight as low as 1 g/m² has proved to give satisfactory results. It is important, though, that the combined thickness of the inner layer and the adhesion layer amounts to at least 30 g/m², since otherwise, in unfavourable circumstances (mechanical damages etc.) the edible oil may come into contact with the metal foil layer 7.

The manufacture of the packing laminate in accordance with the invention takes place substantially in a conventional manner, in that the carrier layer by means of extrusion is coated successively with the different surface layer. The aluminium foil is appled from a roll, the polyethylene layer 6 serving as a binder. The adhesion layer 9 and the inner layer 8 can be applied each separately directly after one another or through coextrusion.

The conversion of the laminate to individual packing containers may also be done in a conventional manner, e.g. by supplying the packing laminate in form of a roll to a packaging machine, wherein it is converted to a tube which is filled with contents and sealed off by means of repeated transverse seals so that cushion-shaped, filled packing containers are produced. The cushion-shaped packing containers are then form-processed to parallelepipedic shape in that their corner lugs are flattened, folded down and sealed to the outside of the packing container.

By making use of a combination of LLDPE and LDPE for the inner layer 8 an inner layer is obtained which resists the effect of the oil even during prolonged contact, and any appreciable reduction in the stretching ability of the inner layer could not be observed in practical experiments. The mixing ratio between LLDPE and LDPE can be varied, but experiments and tests have shown that an admixture of LLDPE of approx. 85% by weight of the total weight (LLDPE+LDPE) of the layer provides a material layer of substantially the same elongation properties in transverse as well as in longitudinal direction which is of decisive importance in order to prevent crack formation when the finished laminate is folded during its conversion to packing containers.

If the admixture of LLDPE is reduced to between 50 and 85% by weight improved extrusion properties are obtained, that is to say the extrusion can be carried out at a faster rate without the thickness of layer or the uniformity being negatively affected. The admixture of LLDPE between 50 and 85% results in poorer elongation properties of the finished layer, and if the admixture is reduced to below approx. 50% the transverse elongation properties of the layer are reduced to such an extent that it becomes unsuitable for use in the packaging of oil or oil-containing products.

In corresponding manner there is an upper limit to the admixture of LLDPE at approx. 90% by weight. Above this limit on contact with oil the longitudinal properties are impaired and the material no longer can be used with such contents.

An important factor regarding the possibilities of extruding the material is also the so-called melt-index of the material which can be varied to a certain extent depending upon the mixing ratio between LLDPE and LDPE together with the melt index of these two types of material making up the mixture. Thus preferably an LDPE of a melt index in the range of 5.5-8 g/10 min (dg/min) is chosen which together with an LLDPE of a melt index of approx. 3.7 g/10 min gives the mixture a melt index of at least 3.5 g/10 min. The melt index of the mixture should be between 3.5 and 7.0 g/10 min, which produces an easy-flowing mixture of good extrudability.

A typical laminate in accordance with the invention which is used for the manufacture of packing containers of a volume of 1 liter (TETRA BRIK ®) comprises the following layers (starting from the outside of the laminate):

| | |
|---|---|
| LDPE | 12 g/m² |
| Paper | 225 g/m² |
| LDPE | 25 g/m² |

-continued

| Al foil | 7μ |
| --- | --- |
| EAA | 8 g/m² |
| LLDPE + LDPE | 27 g/m² |

This material in practice proved to have excellent properties for the packaging of oil, and the oil-resistance of the inner layer permits storage over a long period without any stress-cracking or other defects arising.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A multi-layer packing laminate including a carrier layer of material imparting stiffness to the laminate, a layer of low-density polyethylene provided on one side of the carrier layer, a layer of foil provided on the layer of low-density polyethylene, a layer of adhesive material provided on the foil layer, an additional layer of low-density polyethylene provided on the opposite side of the carrier layer, the improvement comprising: a layer of liquid-tight material extruded on the adhesive layer, the layer of liquid-tight material being an admixture consisting of low-density polyethylene and linear low-density polyethylene.

2. A packing laminate in accordance with claim 1, wherein the linear low-density polyethylene content in the layer is in the range of 50 to 90% of total weight of the mixture.

3. A packing laminate in accordance with claim 2, wherein the linear low-density polyethylene admixture is substantially 85% by weight of the total weight of linear low-density polyethylene and low-density polyethylene in the plastic layer.

4. A packing laminate in accordance with claim 1, wherein said layer has a coating weight in the range of 20 g/m² to 30 g/m².

5. A packing laminate in accordance with claim 1, wherein the adhesive layer has a coating weight in the range of 1 to 15 g/m².

6. A packing lamainate in accordance with claim 5, wherein the adhesive layer and the plastic layer have a combined coating weight of a minimum of 30 g/m².

* * * * *